(12) United States Patent
Lida et al.

(10) Patent No.: US 8,325,769 B2
(45) Date of Patent: *Dec. 4, 2012

(54) METHODS FOR TRANSMITTING DIGITAL MULTIMEDIA AND DATA OVER THE SAME WIRES

(75) Inventors: Eyran Lida, Kfar Ha-Oranim (IL); Nadav Banet, Kadima (IL); Gaby Gur Cohen, Tel-Mond (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 1006 days.

This patent is subject to a terminal disclaimer.

(21) Appl. No.: 12/348,311

(22) Filed: Jan. 4, 2009

(65) Prior Publication Data

US 2009/0116548 A1    May 7, 2009

Related U.S. Application Data

(63) Continuation of application No. 11/703,080, filed on Feb. 7, 2007.

(51) Int. Cl.
*H04L 12/56* (2006.01)
*H04J 1/16* (2006.01)

(52) U.S. Cl. .................. 370/535; 370/252; 370/430

(58) Field of Classification Search .................. 370/252, 370/430, 535
See application file for complete search history.

(56) References Cited

U.S. PATENT DOCUMENTS

| | | |
|---|---|---|
| 6,865,232 B1 | 3/2005 | Isaksson |
| 6,925,070 B2 | 8/2005 | Proctor, Jr. |
| 6,987,754 B2 | 1/2006 | Shahar |
| 7,043,210 B2 | 5/2006 | Zhu |
| 7,321,614 B2 | 1/2008 | Jacobsen |
| 8,107,368 B2 * | 1/2012 | Connors et al. ............... 370/230 |
| 2005/0132223 A1 | 6/2005 | Stephens |
| 2005/0197065 A1 | 9/2005 | Tamaki |
| 2005/0229216 A1 | 10/2005 | Gin |
| 2007/0116151 A1 | 5/2007 | Thesling |
| 2008/0069193 A1 | 3/2008 | Shridhar |
| 2008/0082625 A1 | 4/2008 | Karaoguz |
| 2008/0212517 A1 | 9/2008 | Thesling |
| 2010/0229205 A1* | 9/2010 | Hakusui ......................... 725/62 |

\* cited by examiner

*Primary Examiner* — John Pezzlo

(57) ABSTRACT

A method of transmitting a data stream over a communication channel, the method comprising: providing symbol sets having different numbers of symbols; modulating data in the data stream that warrant different degrees of protection against noise onto symbols from symbol sets having different numbers of symbols, wherein which symbol set given data in the stream is modulated onto is independent of symbol sets onto which other data in the data stream is modulated onto; and transmitting the symbols.

36 Claims, 4 Drawing Sheets

METHODS FOR TRANSMITTING DIGITAL MULTIMEDIA AND DATA OVER THE SAME WIRES

CROSS-REFERENCE TO RELATED APPLICATIONS

This application is a continuation of application Ser. No. 11/703,080, filed on Feb. 7, 2007, incorporated herein by reference.

BACKGROUND

Today's work and play environments in the home and/or office are replete with numerous and various devices and appliances, hereinafter referred to generically as appliances, such as home entertainment systems, play stations, computers and surveillance equipment that people use for entertainment and work. The appliances actively interface and communicate with their users via video and/or audio displays to provide entertainment and/or to present information that they generate or receive. Behind the communication interface with human users, the appliances carry on a continuous chatter of digital communication among themselves, sending and receiving control, information and entertainment data that enable them to maintain the data processing and presentations they provide to the users Various digital communication systems and networks supported by different physical infrastructures and standards for their operation have been developed to provide the communication needs and demands of the appliances and the users who use them. The physical infrastructures may comprise coaxial cables, twisted pair cables, phone lines, and/or power lines and/or may comprise wireless communication channels. However, new appliances and configurations of appliances are constantly offering users new features and services that generally require digital communication networks having increased bandwidth. The continual flow of new features and services and demand for increased bandwidth have generated a "patch work" of different communication systems and networks and standards for managing the systems and networks aimed at satisfying the demand.

For example, the development of flat panel LCD digital displays stimulated the development of digital video interfacing (DVI) utilizing Transition Minimized Differential Signaling (TMDS) technology for high-speed transmission of uncompressed serial digital data. Different communication standards defining communication systems incorporating add on features and improvements for transmitting high definition multimedia content such as high definition video, digital music, digital photos and DVD entertainment from a Source of such content, e.g. a DVD or Set Top Box (STB), to a Sink of the content, such as a TV, material followed. Among the standards are High Definition Multimedia Interface (HDMI), Unified Display Interface (UDI) and DisplayPort.

Whereas the various multimedia communication standards and systems provide relatively high data transfer rates, they are generally configured to provide simplex data transmission of multimedia content at relatively high bit error rates (BER) from a Source of multimedia content to a Sink of the content over relatively short distances. The standards and systems generally require special dedicated connectors and cable assemblies and their transmission is generally limited to a reach of less than about 15 meters. Duplex and half duplex transmission of control data between a Source and a Sink that the standards require is performed at relatively low bandwidth of up to 1 Mbps and is generally supported by a dedicated channel separate from the channel over which the simplex multimedia data is transmitted.

The noted multimedia standards and systems do not support high quality relatively low BER full duplex data transmission that is generally required by communication networks that support information exchange between various appliances, e.g. various computer platforms, in a household or office environment. For example, uncompressed high definition video may be streamed from Source to Sink by these systems at data rates of about a gigabit per second (Gbps) for each of the red green and blue (RGB) color channels used to provide video. At these rates, substantial noise and in particular echo and near end cross talk (NEXT) may be generated that interferes with data transmission and to provide information exchange at an acceptable BER, the exchanged information must generally be protected by a relatively large coding overhead of redundant bits. The increased overhead substantially increases complexity of coding and decoding software and hardware required to process the information and thereby the cost of the systems if they are configured to support full duplex communication.

Full duplex information exchange between appliances at the home and office that are characterized by relatively low BER are typically provided by networks such Ethernet 100 Base-T, WIFI, MOCA HOMEPNA or HOMEPLUG AV. The various Ethernet networks provide duplex information exchange over twisted pair wires at bandwidths that correspond to ratings of the twisted pairs. WIFI provides information exchange over wireless channels. MOCA provides communication over coaxial cable. HOMEPNA and HOMEPLUG AV support in-home networking over copper phone lines and power lines respectively that exist in the home.

The various information exchange networks do not in general provide sufficient bandwidth to support transmission of uncompressed multimedia content, which typically requires data transmission rates of about 1 Gbps for each of the R, G and B color channels of a video display. A latest Ethernet standard 10Gbase-T, while having sufficient bandwidth for supporting transmission of uncompressed high definition multimedia content, is not configured to do so. It does not provide multimedia clock regeneration or support for Hot Plug Detection (HPD), Consumer Electronics Control (CEC) or Display Data Channel (DDC). 10Gbase-T networks are designed to cope with echo, NEXT and alien cross talk (AN-EXT) and comprise terminal equipment that implements relatively complex echo/cross talk cancellers and support processing relatively large error correction overheads. As a result, 10Gbase-T terminal equipment and networks are relatively complicated and expensive.

Since none of the various multimedia communication systems and information exchange communication networks provide both satisfactory uncompressed multimedia transmission and information exchange, home and office environments that provide both are equipped with a complex of different hardware and software systems.

SUMMARY

An aspect of some embodiments of the invention relates to providing a single flexible format for transmitting different types of data over a same physical communication network. In accordance with an embodiment of the invention, data is transmitted over the network in packets of waveforms and the uniform flexible format comprises a uniform format for the packet, hereinafter referred to as a "U-Pac", for encapsulating data for transmission over the physical communication network. The different types of data optionally comprise information exchange data such as Ethernet data and uncompressed multimedia audiovisual data such as HDMI 1.3, DVI 1.0, UDI and/or DisplayPort data.

An aspect of some embodiments of the invention, relates to providing resistance to noise for data transmitted over the same physical network responsive to the type of data transmitted and/or a desired degree of protection against noise. Different degrees of resistance to noise are provided by modulating different types of data that warrant different degrees of protection against noise onto waveform sets having different numbers of waveforms. Optionally, the waveform sets having different numbers of waveforms are chosen from waveform sets comprising a largest set having a largest number of waveforms and subsets of the largest set.

According to an aspect of some embodiments of the invention, in a data stream comprising data modulated onto a sequence of waveforms, choice of a waveform onto which given data is modulated is independent of choices of waveforms onto which other data in the data stream is modulated. For example, in some embodiments of the invention, in a data stream comprising data modulated onto a sequence of waveforms, temporally adjacent waveforms are, optionally, chosen from different waveform sets. If data in the data stream is modulated onto and transmitted in waveform packets, such as a U-Pac, a same waveform packet may contain waveforms chosen from different waveform sets.

By way of example, let a waveform set comprising i waveforms chosen from M waveforms comprised in a largest set of waveforms be represented by $S(M,i)$, where the largest set of waveforms is represented by $S(M,M)$ and i satisfies a relation $0 < i \leq M$. Then, in accordance with an embodiment of the invention, if a first type of data is modulated onto a waveform set $S(M,i)$, a second type of data warranting higher resistance to noise than the first type of data is modulated for transmission onto a waveform set $S(M,j)$ where $j<i$. If data is encapsulated in U-Pacs, a same U-Pac optionally comprises encapsulated data modulated onto different symbol sets to provide different data in the U-Pac with different levels of protections against noise. Optionally, the different symbol sets are chosen from a set $\{S(M,i): 0<i \leq M\}$ of symbol sets.

It is noted that choosing waveform sets from a same largest waveform set can be advantageous in simplifying implementation of a communication network that transmits data in accordance with an embodiment of the invention. For example, if all waveforms onto which the data is modulated are chosen from a same largest waveform set, different slicers do not have to be used to slice waveforms from different waveform sets and substantially identical slicers may be used in all receivers in the network. The slicers optionally slice and generate error directions for all received waveforms assuming that the waveforms are waveforms in the largest waveform set, independent of the actual waveform set to which a given waveform belongs. In accordance with an embodiment of the invention, demodulation of a given received waveform to a correct waveform of a waveform set to which the given waveform belongs is performed using information carried in the data indicating the waveform set to which the given waveform belongs.

Hereinafter, a waveform onto which data is modulated for transmission is also referred to as a "symbol" and a set of waveforms onto which data is modulated is also referred to as a "symbol set". Modulating data onto waveform sets comprising different numbers of waveforms in accordance with an embodiment of the invention is referred to as dynamic waveform modulation (DWM). For convenience alphabetic and/or alphanumeric designations used to represent symbol sets may also be used in referencing symbols belonging to the symbol set. For example, the alphabetic symbol set designation $S(M,i)$ may also be used in referencing a symbol belonging to the symbol set $S(M,i)$. Similarly, a designation of a symbol may be used to designate a symbol set to which the symbol belongs.

Different types of waveforms, such as for example, frequency shift, phase shift or amplitude shift keyed waveforms, may be used in the practice of embodiments of the invention. Optionally, a largest waveform set $S(M,M)$ comprises an M-ary pulse-modulation symbol set having $M=2^k$ different waveforms. In some embodiments of the invention, the pulse-modulation waveforms are pulse amplitude modulation (PAM) symbols. Optionally, the symbols are pulse-position modulation (PPM) symbols. Optionally, the symbols are pulse-duration modulation (PDM) symbols. For convenience of presentation, it is assumed hereinafter that symbols are PAM symbols, a largest set of PAM symbols is represented by $P(M,M)$ and a subset of $P(M,M)$ comprising i PAM symbols is represented by $P(M,i)$.

In some embodiments of the invention, the symbols onto which data is modulated for transmission are transmitted over a twisted pair (TP) cable optionally comprising four pairs of twisted wires. Optionally, each symbol is a four-dimensional symbol comprising four substantially simultaneously transmitted "one dimensional" symbols, each transmitted over a different twisted pair of the TP cable.

Let, a four-dimensional symbol in accordance with an embodiment of the invention be represented by "S4D". In accordance with an embodiment of the invention, each of the one dimensional symbols that make up a four dimensional symbol S4D is chosen from a same set of one-dimensional symbols $S(M,i)$. The index i is smaller for types of data warranting higher noise resistance than for types of data warranting lower noise protection. Let a four dimensional symbol comprising one dimensional symbols $S(M,i)$ (i.e. symbols chosen from the $S(M,i)$ symbol set) be represented by "S4D-S(M,i)". A four dimensional symbol comprising one dimensional PAM symbols $P(M)_i$ is represented by "S4D-P(M,i)".

In some embodiments of the invention, the TP cable is a Cat5e or Cat6 unshielded TP (UTP) cable comprising unshielded twisted pairs. Optionally, the TP cable is up to about 100 m in length and four-dimensional symbols S4D are transmitted over the TP cable at a rate of 250 Msym/s (mega-symbols per second) per TP. Assuming that each one dimensional symbol in a S4D symbol is a PAM(16,16) symbol (i.e. each PAM symbol is a four bit symbol) each TP transmits data at a rate of about 1 Gbps (a gigabit per second) for a total bandwidth of about 4 Gbps. In some embodiments of the invention, the TP cable is up to about 70 m in length and S4D symbols are transmitted over the cable at a rate of 500 Msym/s per TP for a total bandwidth of about 8 Gbps.

An aspect of some embodiments of the invention relates to providing a method of reducing noise generated in a communication channel over which both uncompressed multimedia data is transmitted from a Source to a Sink in simplex mode and over which data is exchanged between the Source and the Sink in full duplex mode.

The inventors have noted that for a communication channel transmitting uncompressed multimedia data in simplex and information data in duplex between a Source and Sink, relatively large amounts of noise at the Sink are due to Echo and Near End Cross Talk (NEXT). In accordance with an embodiment of the invention, to reduce Echo and NEXT, information data from the Sink to the Source is transmitted at a lower symbol rate than a symbol rate at which the multimedia data is transmitted from the Source to the Sink. Optionally, the Source to Sink multimedia symbol rate is greater than about 10 times the Source to Sink information symbol rate. Optionally, the multimedia symbol rate is greater than 20 times the Source to Sink information symbol rate. Optionally, the multimedia symbol rate is greater than 30 times the Source to Sink information symbol rate. Optionally, the multimedia symbol rate about 40 times the Source to Sink information symbol rate. A network configured to transmit from Sink to Source in accordance with an embodiment of the invention can substantially reduce NEXT and Echo at the sink and as a result may enable relatively inexpensive terminal equipment to be used in the network.

There is therefore provided in accordance with an embodiment of the invention, a method of transmitting a data stream over a communication channel, the method comprising: providing symbol sets having different numbers of symbols; modulating data in the data stream that warrant different degrees of protection against noise onto symbols from symbol sets having different numbers of symbols, wherein which symbol set given data in the stream is modulated onto is independent of symbol sets onto which other data in the data stream is modulated onto; and transmitting the symbols.

Optionally, the symbol sets are chosen from symbol sets comprising a largest set having a largest number of symbols and subsets of the largest set. Additionally or alternatively, the method comprises configuring symbols into packets. Optionally, configuring symbols into packets comprises configuring symbols from symbol sets having different numbers of symbols into a same packet.

In some embodiments of the invention, temporally adjacent symbols are chosen from symbol sets having different numbers of symbols.

In some embodiments of the invention, each symbol is a multidimensional symbol comprising a plurality of symbols that are substantially simultaneously transmitted over the channel. Optionally, the multidimensional symbol is a four dimensional symbol comprising four symbols chosen from a same set of symbols.

In some embodiments of the invention, the symbols comprise frequency shift symbols. In some embodiments of the invention, the symbols comprise phase shift symbols. In some embodiments of the invention, the symbols comprise amplitude shift symbols. In some embodiments of the invention, the symbols comprise pulse-modulation symbols. In some embodiments of the invention, the symbols comprise pulse-position modulation (PPM) symbols. In some embodiments of the invention, the symbols comprise pulse-duration modulation (PDM) symbols. In some embodiments of the invention, the symbols comprise pulse amplitude modulation (PAM) symbols.

In some embodiments of the invention, the largest set comprises 16 symbols.

In some embodiments of the invention the method comprises transmitting the symbols at a transmission rate up to about 250 Msym/sec. In some embodiments of the invention the method comprises transmitting the symbols at a transmission rate up to about 500 Msym/sec.

In some embodiments of the invention the method comprises transmitting data comprises transmitting in simplex mode. Optionally, transmitting data comprises transmitting in full duplex mode over the channel. Optionally, transmitting in full duplex mode comprises transmitting data at different rates in different directions over the channel.

There is further provided in accordance with an embodiment of the invention, a method of transmitting data over a communication channel, the method comprising: transmitting data in simplex mode over the communication channel; and transmitting data in full duplex mode at different rates in different directions over the channel.

Alternatively or additionally, transmitting data in full duplex mode comprises transmitting data at a first rate in a direction in which the simplex data is transmitted and at a second rate lower than the first rate in a direction opposite the simplex direction.

In some embodiments of the invention, the data comprises Transition Minimized Differential Signaling (TMDS) data. In some embodiments of the invention, the data comprises DisplayPort data. In some embodiments of the invention, the data comprises uncompressed data. In some embodiments of the invention, the data comprises multimedia data. Optionally, the multimedia data comprises high definition multimedia data.

In some embodiments of the invention, the method comprises transmitting data in full duplex mode over the channel. In some embodiments of the invention, the data comprises Ethernet data.

In some embodiments of the invention, the channel comprises a twisted pair cable. Optionally, the twisted pair cable comprises four twisted pairs. Additionally or alternatively, the twisted pairs are unshielded. In some embodiments of the invention, the twisted pairs are shielded. In some embodiments of the invention, the cable is a Cat5e cable. In some embodiments of the invention, the cable is a Cat6 cable.

In some embodiments of the invention, simplex and full duplex data are transmitted over a same twisted pair.

There is further provided in accordance with an embodiment of the invention, a communication system comprising: a communication channel; and first and second transceivers that communicate with each other over the channel in simplex and in full duplex mode; wherein data in full duplex mode is transmitted at different rates in different directions over the channel.

Optionally, data in full duplex mode is transmitted at a first rate in a direction in which the simplex data is transmitted and at a second rate lower than the first rate in a direction opposite the simplex direction. Additionally or alternatively, the first transceiver transmits data in a data stream to the second transceiver and modulates data in the data stream that warrant different degrees of protection against noise onto symbols from symbol sets having different numbers of symbols. Optionally, the symbol sets are chosen from symbol sets comprising a largest set having a largest number of symbols and subsets of the largest set. Optionally, the first transceiver configures symbols into packets. Optionally, the first transceiver packets symbols from symbol sets having different numbers of symbols into a same packet. In some embodiments of the invention, the first transceiver packets symbols from symbol sets having different numbers of symbols temporally adjacent each other.

In some embodiments of the invention, the data comprises Transition Minimized Differential Signaling (TMDS) data. In some embodiments of the invention, the data comprises DisplayPort data. In some embodiments of the invention, the data comprises uncompressed data. In some embodiments of the invention, the data comprises multimedia data. Optionally, the multimedia data comprises high definition multimedia data. In some embodiments of the invention, the data comprises Ethernet data.

In some embodiments of the invention, the channel comprises a twisted pair cable. Optionally, the twisted pair cable comprises four twisted pairs. Additionally or alternatively, the twisted pairs are unshielded. In some embodiments of the invention, the twisted pairs are shielded. In some embodiments of the invention, the cable is a Cat5e cable. In some embodiments of the invention, the cable is a Cat6 cable. In some embodiments of the invention, simplex and full duplex data are transmitted over a same twisted pair.

There is further provided in accordance with an embodiment of the invention, a transceiver comprising: a receiver for receiving data transmitted over a communication channel; a transmitter for transmitting data over the communication channel; and circuitry for modulating data for transmission over the channel by the transmitter that modulates data that warrant different degrees of protection against noise onto symbols from symbol sets having different numbers of symbols. Optionally, the symbol sets are chosen from symbol sets comprising a largest set having a largest number of symbols and subsets of the largest set. Additionally or alternatively, the circuitry configures symbols into packets. In some embodiments of the invention, the circuitry packets symbols from symbol sets having different numbers of symbols into a same packet. In some embodiments of the invention, the circuitry packets symbols from symbol sets having different numbers of symbols temporally adjacent each other.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION OF EXEMPLARY EMBODIMENTS

Figure 1A:
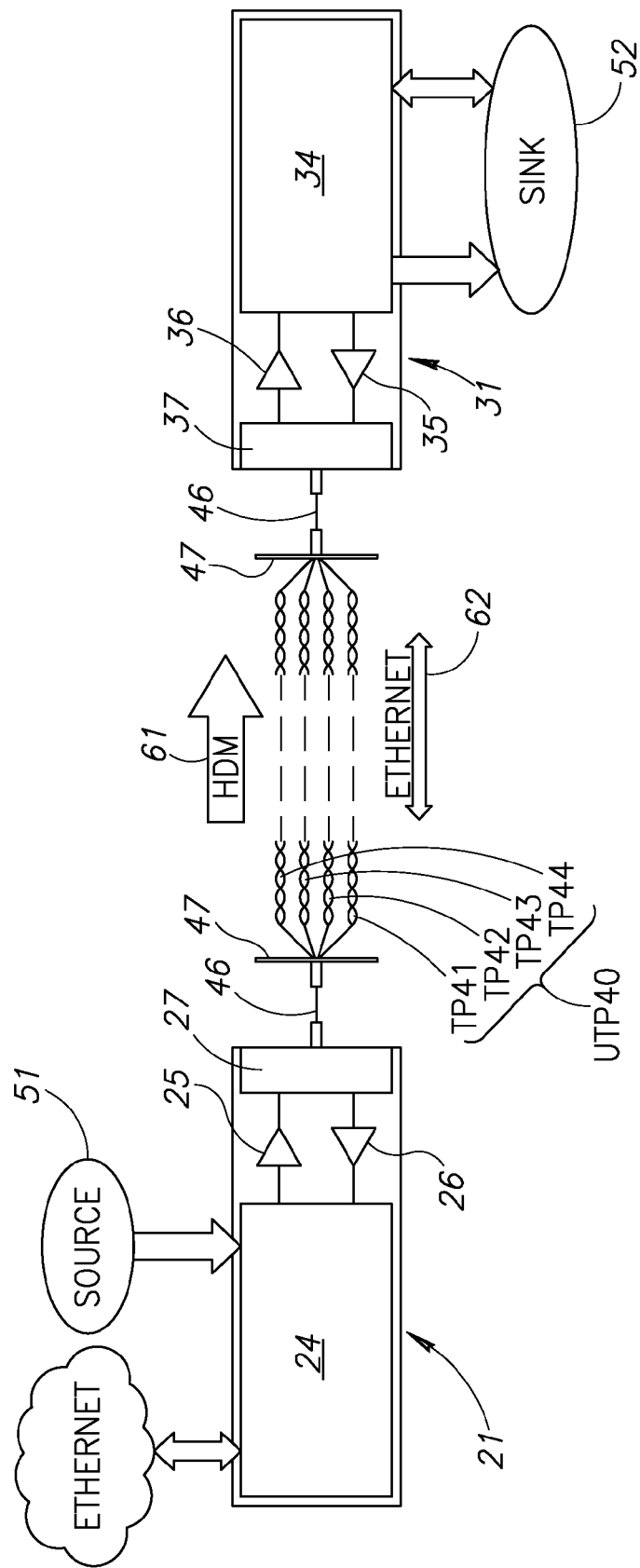
FIG. 1A schematically illustrates transmitting uncompressed multimedia data and Ethernet data over a channel comprising a UTP cable, in accordance with an embodiment of the invention.

FIG. 1 schematically shows first and second transceivers 21 and 31, hereinafter referred to as DWM transceivers 21 and 31, communicating using dynamic waveform modulation (DWM) to package data in U-Pacs, in accordance with an embodiment of the invention.

By way of example, DWM transceiver 21 is coupled to the Ethernet and at least one Source 51 of high definition uncompressed audiovisual (AV) multimedia data from which DWM transceiver receives data to transmit to a Sink 52 via DWM transceiver 31. Optionally, the DWM transceivers 21 and 31 transmit data to each other over an unshielded twisted pair (UTP) cable 40. Optionally, UTP cable 40 is a Cat5e or Cat6 cable comprising four twisted pairs, TP41, TP42, TP43 and TP44. The multimedia data is assumed to be Transition Minimized Differential Signaling Audio Visual (TMDS-AV) data.

DWM transceiver 21 optionally comprises signal processing and control circuitry 24 for encoding/decoding and modulating/demodulating data it receives and for each twisted pair TP41, TP42, TP43 and TP44 of UTP cable 40, a transmitter, receiver and hybrid circuit. The various transmitters, receivers and hybrid circuits are schematically represented by a transmitter 25, a receiver 26 and a hybrid circuit 27 respectively. Optionally, an RJ45 patch 46 mounted to a wall plate 47 couples hybrid circuit 27 to each twisted pair TP41, TP42, TP43 and TP44.

DWM transceiver 31 comprises signal processing and control circuitry 34 for encoding/decoding and modulating/demodulating data it receives and for each twisted pair TP41, TP42, TP43 and TP44 of UTP cable 40, a transmitter, receiver and hybrid circuit. The various transmitters, receivers and hybrid circuits are schematically represented by a transmitter 35, a receiver 36 and a hybrid circuit 37 respectively. Optionally, an RJ45 patch 46 mounted to a wall plate 47 couples hybrid circuit 37 to each twisted pair TP41, TP42, TP43 and TP44.

DWM transceiver 21 receives Ethernet data from the Ethernet and TMDS-AV data and control data from Source 51 and its processing and control circuitry 24 encodes and modulates the data optionally onto symbol (i.e. waveform) sets S4D-S(M,i) of different size responsive to a degree of resistance to noise that is desired for the data. Circuitry 24 then controls transmitter 25 to transmit the symbols in packets, U-Pacs, having a same format. In accordance with an embodiment of the invention, the index i is smaller for data warranting higher noise resistance than for data warranting lower noise protection.

DWM transceiver 31 receives the U-Pacs and its processing and control circuitry 34 demodulates and decodes the symbols they comprise to un-packetize the data they contain and transmits the data to Sink 52. Whereas TMDS-AV data is transmitted in simplex mode from Source 51 to Sink 52, Ethernet and/or control data transmitted from the Sink to the Source in general requires that the Sink provide a response to the Source and Ethernet and control data is transmitted in full duplex between the Source and Sink, in accordance with an embodiment of the invention. Large block arrows 61 schematically represent simplex multimedia TMDS-AV data and double arrowhead block arrows 62 represent full duplex Ethernet and/or control data.

In responding to Ethernet and control data received from Source 51, Sink 52 optionally packetizes its response in U-Pacs using symbol sets S4D-S(M,i) for transmission similarly to the way in which Source 51 packetizes its data for transmission. However, the inventors have noted that transmission of TMDS data and full duplex Ethernet data over a same channel, such as the twisted pair (TP), hybrid terminated channel shown in FIG. 1A, at high transmission rates required by TMDS data can generate substantial amounts of noise in the channel. In particular, echo and near end cross talk (NEXT) generated by near end transmitters make substantial contributions to the noise. Both the near end transmitter Echo and Next can exhibit exponential growth with frequency of signal transmission over a TP channel similar to that shown in FIG. 1A. For example, for a 50 m Cat6 cable, noise can increase by as much as about 30 dB for an increase in frequency of transmission from about 10 MHz to about 300 MHz. The inventors have further noted that full duplex transmission of Ethernet does not in general require a same data transmission rate as transmission of simplex TMDS data. Therefore, in some embodiments of the invention, whereas transceiver 21 is configured to transmit both TMDS data and full duplex Ethernet and/or control data, at a relatively high transmission rate required by TMDS data, transceiver 31 is configured to transmit Ethernet and/or control data to transceiver 21 at a substantially lower transmission rate. The lower transmission rate at which transceiver 31 transmits data can substantially reduce echo and NEXT at transceiver 31.

In some embodiments of the invention, DWM transceiver 21 transmits TMDS and Ethernet and/or control data to transceiver 31 at a transmission rate greater than about 10 times the transmission rate at which DWM transceiver 31 transmits Ethernet and/or control data to transceiver 21. Optionally, DWM transceiver 21 transmits at a transmission rate 20 times greater than DWM transceiver 31. Optionally, DWM transceiver 21 transmits at a transmission rate 30 times greater than DWM transceiver 31. Optionally, DWM transceiver 21 transmits at a transmission rate 40 times greater than DWM transceiver 31. For example, in some embodiments of the invention, DWM transceiver 21 transmits TMDS and Ethernet and/or control data to DWM transceiver 31 at 250 Msym/sec or 500 Msym/sec and DWM transceiver 31 transmits Ethernet and/or control data to transceiver 21 at 12.5 Msym/sec.

It is noted that the relatively low transmission rates at which DWM transceiver 31 transmits data to DWM transceiver 21 can generate significant base line wander (BLW) due to transformers that optionally couple each transceiver to TP cable 40. To reduce possible BLW, DWM transceiver 31 optionally transmits data using "DC-balanced" waveform sets, i.e. DC-balanced symbol sets. Whereas, any suitable DC-balanced waveform set and methods of transmitting such waveform sets known in the art may be used by DWM transceiver 31 to transmit data, optionally DWM transceiver 31 is configured to transmit data using S4D-P(M,i) symbols.

Let a DC-balanced symbol set in accordance with an embodiment of the invention be represented by "±S4D-P(M,i)". In accordance with an embodiment of the invention, the set comprises positive and negative voltage level symbols S4D-P(M,i) and for each positive voltage level symbol, the set comprises a "mirror image" negative voltage level symbol having a same magnitude as the positive level symbol. Mirror image symbols represent identical data and are selectively transmitted by DWM transceiver 31 so that BLW generated by positive symbols is substantially neutralized by transmission of negative mirror image symbols. In accordance with an embodiment of the invention, DWM transceiver 31 uses symbols from a data set ±S4D-P(M,i) having a smaller value of i for data warranting higher noise resistance.

Optionally, the S4D-S(M,i) symbol sets are four dimensional PAM symbols sets S4D-P(M,i) and with each component one-dimension PAM(M,i) symbol of the four dimensional S4D-P(M,i) symbol transmitted substantially simultaneously over a different one of TP41, TP42, TP43 and TP44. For convenience of presentation, it is assumed that the one dimensional PAM symbols are PAM(16,i) symbols and that $i=2^k$ where k is equal to a number of bits of information represented by a PAM(16,i) and satisfies a condition $1 \leq k \leq 4$. The index i has a value equal to 16 for the largest PAM set and assumes values 8, 4 or 2 for subsets of the largest set with symbols in subsets having smaller i and therefore smaller numbers of symbols being easier to distinguish one from the other and having improved symbol error rate (SER). For values of i equal to 16, 8, 4 and 2 each PAM symbol respectively contains 4, 3, 2 and 1 bit of information. Each symbol of the corresponding four-dimensional S4D-P(M,i) symbol sets contains 16, 12, 8 and 4 bits of information.

It is noted that for each decrease in k by 1, an amplitude difference between symbols in a symbol set S4D-P(M,i) is doubled, making it is easier to differentiate between symbols transmitted between transceiver 21 and 31 and improving the signal to mean squared error (MSE) ratio of slicers in the transceivers used in determining which symbols is received by the transceivers. Signal to MSE ratio (MSER) is defined by an expression $MSER=(10*\log_{10}((d/2)^2/E(e^2))$ where d is a minimal distance between slicer decision levels and $E(e^2)$ is a mean of the squared slicer error signal at the decision levels. As a result, for each decrease in k by 1, d doubles and the MSER improves by 6 dB. Assuming Additive White Gaussian Noise (AWGN), in the channel coupling transceivers 21 and 31, for a given level of noise in the channel, improvement in MSER by 6 dB, substantially improves a symbol error rate (SER) in symbols transmitted between the transceivers. For example assuming a SER of $10^{-5}$ a 6 dB improvement in MSE improves the SER to $10^{-17}$ and SERs of $10^{-7}$ and $10^{-9}$ are improved to $10^{-25}$, and $10^{-32}$ respectively. The inventors have determined that the improvement in SER provided by reducing i by 1 provides about a same improvement in SER for a AWGN channel as is provided by encoding data in accordance with a Reed-Solomon (RS) code having an error correction capability of up to 3 data symbols.

Figure 1B:
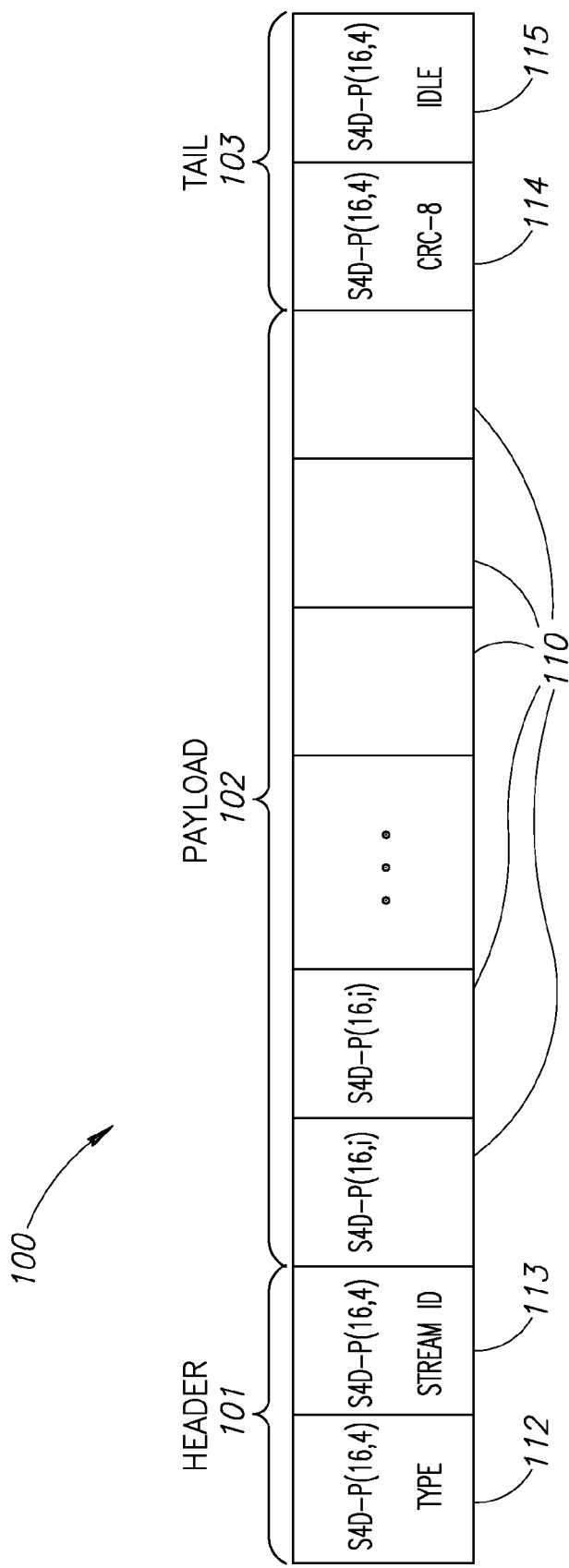
FIG. 1B schematically shows a U-Pac comprising symbols, in accordance with an embodiment of the invention.

FIG. 1B schematically shows a U-Pac 100 comprising S4D-P(16,i) symbols in accordance with an embodiment of the invention. U-Pac 100 comprises a header section 101, a payload section 102 and a tail section 103. Payload section 102 comprises a plurality of symbols 110 that encode "payload" data to be delivered from one to the other of Source 51 and Sink 52 (FIG. 1A). The data in the payload section of U-Pac 100 is encoded and modulated onto S4D-P(16,i) symbols having index i which depends upon a level of protection against noise with which it is desired to protect the data. In accordance with an embodiment of the invention, different parts of payload 102 may have different values of i and thereby different levels of SER and anti-noise protection. Header 101 and tail 103 comprise management data used for processing information comprised in the packet and data in the header and tail is encoded and modulated onto S4D-P(16, 4) symbols each representing 8 bits to provide the data with relatively low SER. Optionally, the header comprises two symbols, a type symbol 112 and a Stream ID symbol 113. Type symbol 112 is optionally configured to characterize up to 64 different types, examples of which are discussed below, of U-Pacs. Stream ID comprises data that identifies Source 51 and Sink 52. Tail 103 optionally comprises a CRC-8 symbol 114 and an idle symbol 115 that marks the end of U-Pac 100.

Figure 2:
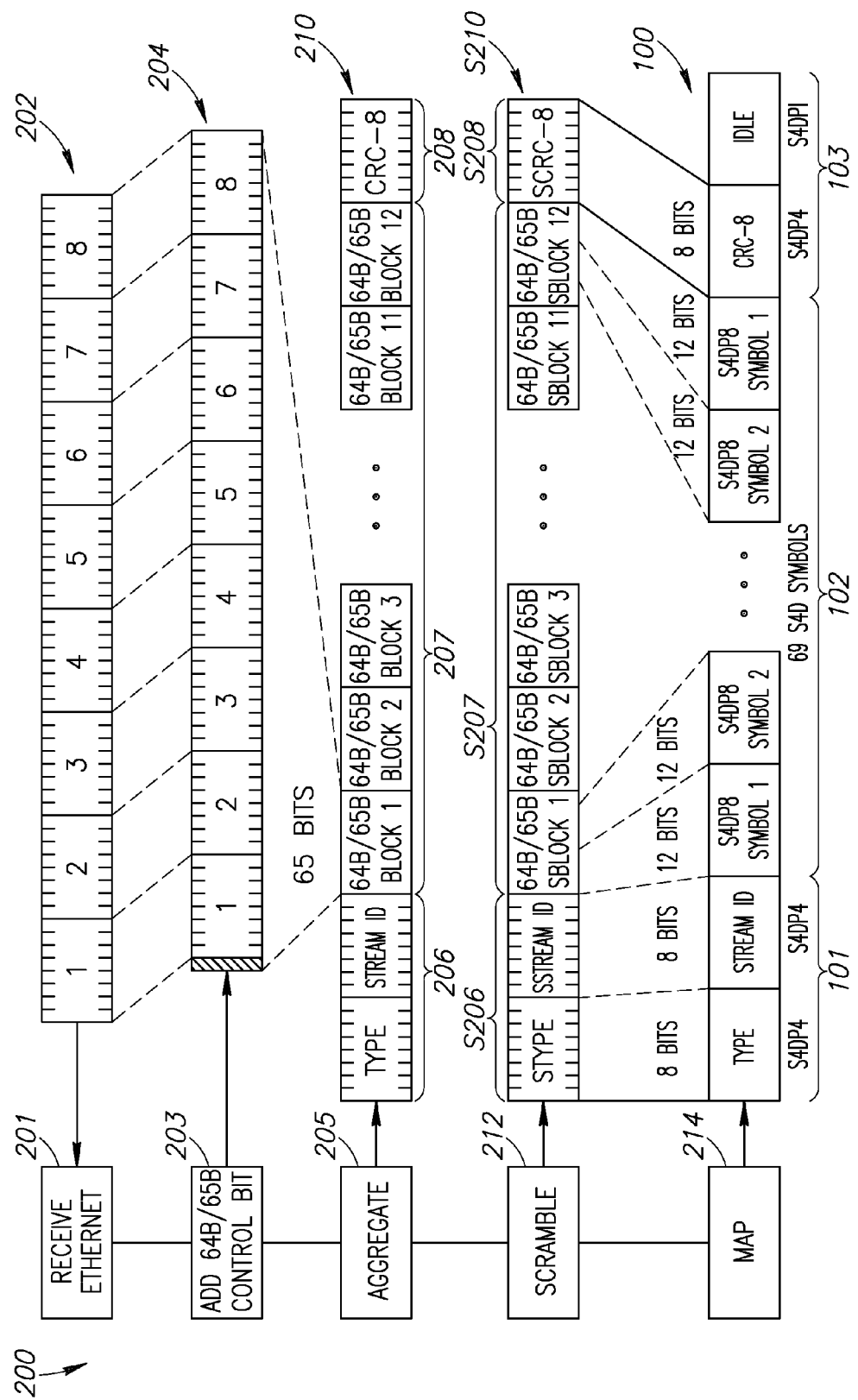
FIG. 2 schematically illustrates encapsulating Ethernet data in a U-Pac of the form shown in FIG. 1B, in accordance with an embodiment of the invention.

By way of example, FIG. 2 shows a flow chart 200 schematically illustrating encapsulating Ethernet data into a U-Pac 100, in accordance with an embodiment of the invention.

In a process step 201a stream of Ethernet data to be transmitted to Sink 52 is received by first transceiver 21. A block 202 of eight (8) Ethernet octets in the stream of Ethernet data is schematically shown to the right of process step 201. In a process step 203 a data/control bit shown shaded is added to the eight (8) Ethernet octets shown in block 202 to a form a "64B/65B" code block 204 of sixty-five (65) bits.

In a step 205 twelve sixty-five (65) bit code blocks 204 are aggregated to form a payload data section 207 that will become with further processing a payload section of U-Pac 100. A header data section 206 and tail data section 208 are added to the payload section to form an aggregate code block 210. Header data section 206 optionally comprises a "Type" octet that defines the type of data in the aggregate and U-Pac 100 as Ethernet data and a Stream ID octet. Tail 208 optionally comprises a CRC-8 octet. Aggregate code block 210 comprises 768 Ethernet payload bits and 36 control bits (header and tale bits plus the control bit added in step 203) for a total of 804 bits. Optionally, the data in aggregate block 210 is scrambled in a step 212 to provide a scrambled aggregate data block S210 having header, payload and tail sections S206, S207 and S208 respectively. In a step 214, the data in scrambled, aggregate code block S210 is mapped onto a set of S4D-P(16,i) symbols and a symbol is added to tail S208 to generate header 101, payload 102 and tail 103 of a U-Pac 100.

In accordance with an embodiment of the invention, data in header section S206 and tail section S208 of scrambled aggregate S210 is mapped to S4D-P(16,4) symbols, each of which represents 8 bits of data, to provide the control data with a relatively low SER. Header 101 and tail 103 have two (2) S4D-P(16,4) symbols each. The Ethernet data in payload section S207 is optionally mapped to S4D-P(16,8) symbols in payload 102, each of which symbols represents 12 bits of data, so that payload 102 has sixty-five (65) S4D-P(16,8) symbols. U-Pac 100 therefore comprises a total of sixty-nine (69) S4D-P(16,i) symbols and comprises 768 bits of Ethernet payload data. Assuming the Ethernet data received by DWM transceiver 21 is 100 Mbps Ethernet, to support the data transmission rate the transceiver transmits an Ethernet U-Pac 100 of 69 S4D-P(16,i) symbols to Sink 52 via DWM transceiver 31, in accordance with an embodiment of the invention, every 7.68 μs for a transmission rate of about 9 Mega-symbols of Ethernet data per second (Msym/sec). Optionally, Sink 52 (FIG. 1A) responds to the Ethernet information it receives at a same rate, and transmits back to transceiver 21 via transceiver 31 about 9 Mega-symbols of Ethernet data per second (Msym/sec). Symbol transmission between DWM transceivers 21 and 31 in accordance with an embodiment of the invention, therefore operates in a full duplex mode that supports 100 Mbps full duplex Ethernet transmission.

Figure 3:
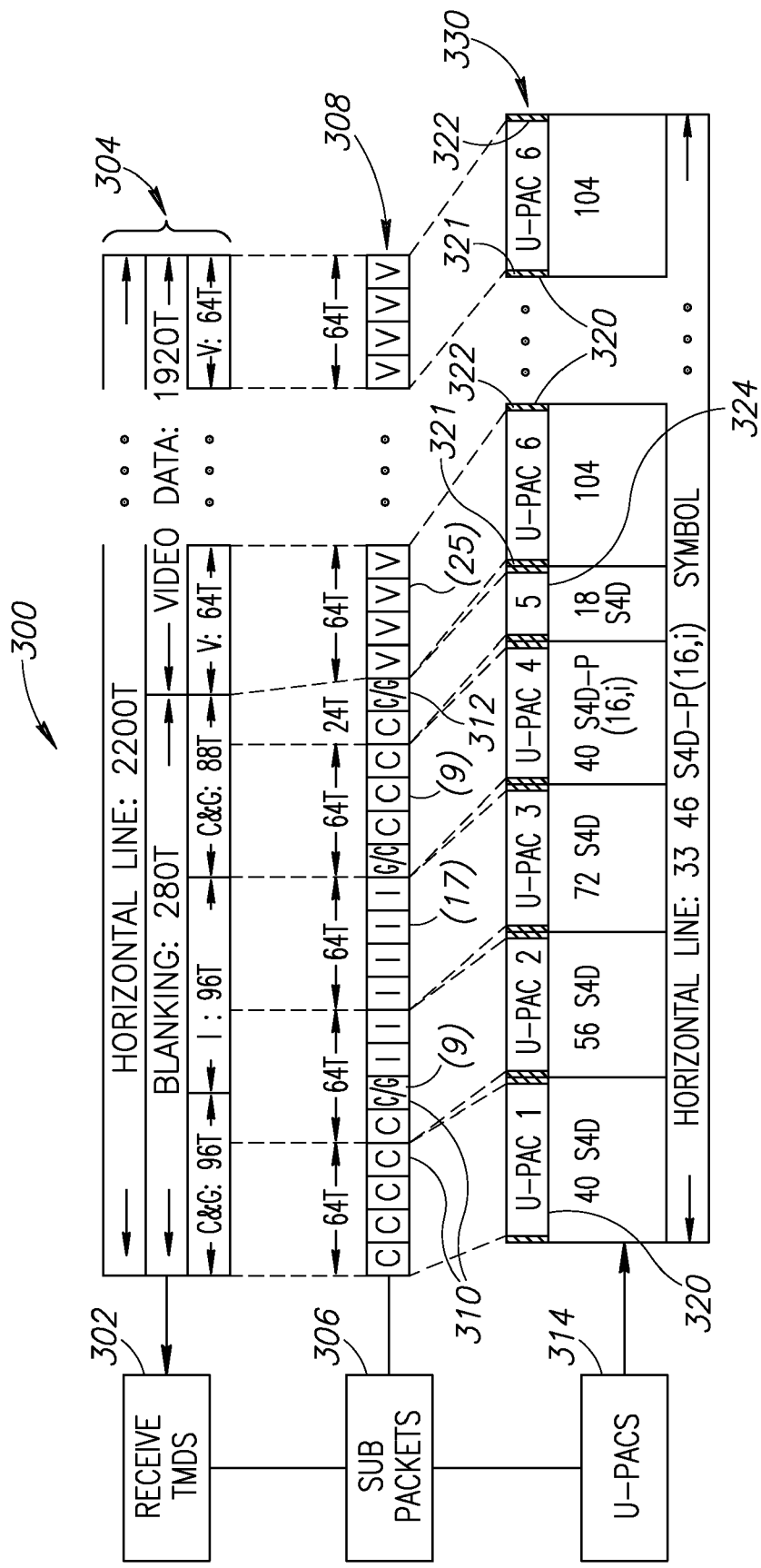
FIG. 3 schematically illustrates encoding multimedia Transition Minimized Differential Signaling (TMDS) data in a U-Pac of the form shown in FIG. 1B, in accordance with an embodiment of the invention.

FIG. 3 shows a flow chart 300 that schematically illustrates encapsulating TMDS-AV data from a TMDS-AV data stream used for generating an audiovisual display into U-Pacs, in accordance with an embodiment of the invention.

A stream of TMDS-AV data comprises three different types of data transmitted during periods, hereinafter referred to as "TMDS periods" or "T-periods", having fixed duration "T". During each TMDS period one of the three different types of data is transmitted for each of three TMDS channels. The types of data are video data ("V" data), control data ("C" data) and data-island packet data ("I" data). During video data periods, also referred to as a "V periods", each TMDS channel carries pixel color data encoded in 8 bits, for a total of 24 bits of video data per period. During data island TMDS periods, also referred to as "I periods", the TMDS channels carry audio data, which may comprise for example audio samples acquired at 192 kHz for each of 8 audio channels and information frames, "infoframes", comprising data that characterizes audio and video data in the TMDS-AV stream. During an I period each TMDS channel carries 4 bits of data so that the three TDMS channels carry a total of 12 bits of data during the I period. During control data TMDS periods, also referred to as "C periods", the TMDS channels carry inter alia horizontal and vertical synchronization data. Each TDMS channel typically carries 2 bits of control data during a C period for a total of 6 bits of control data during the period. Sequences of different types of TMDS periods in the TDMS-AV stream are generally separated from each other by "guard bands" that are 2 TDMS periods, "G periods", long.

In a process step 302 in FIG. 3 DWM transceiver 21 receives a TMDS-AV data stream to be transmitted to Sink 52 via DWM transceiver 31. A data block 304 of data in the TMDS-AV stream encoding a single horizontal line of video data and accompanying audio data is schematically shown being received by the transceiver. The data is assumed, by way of example, to be used to generate a progressive video display that is refreshed at 60 Hz and comprises 1080 active and 45 blank horizontal lines, each having 1920 24 bit pixels and 280 blank pixels. The video display is assumed accompanied by eight 8 audio channels sampled at 192 kHz to provide 8 level samples. Data block 304 therefore is 2200 TMDS periods long, of which 1920 periods are video data periods, i.e. V periods, during each of which 24 bits of pixel data are transmitted and 280 TMDS periods are "blank" TMDS periods. In FIG. 3 a TMDS T-period is generically denoted by its duration "T". Of the 280 blank T-periods a first 96 T-periods comprise control, C periods, or guard band, G periods each carrying 6 bits of data, a middle 96 periods comprise data island, I periods each carrying 12 bits encoding audio data and a last 88 periods comprise control C or G periods.

In accordance with an embodiment of the invention, in a process block 306 each 16 T-periods of TMDS data in data block 304 are encoded into S4D-P(16,i) symbols, and a header, hereinafter a "sub-packet header", added to the symbols to form a sub-packet. The sub-packet header optionally comprises a S4D-P(16,4) symbol that characterizes the data in the sub-packet. For example, the sub-packet header optionally distinguishes between a sub-packet comprising only control data from a sub-packet comprising control and guard data or a sub-packet comprising only data island data. Sub-packets 310 generated in process step 306 from data in data block 304 are schematically shown in a data block 308 and are labeled with a letter or letters indicating the type of data they contain. Sub-packets 310 labeled "C", "I", or "V" comprise only control, data island or video pixel data respectively. "Mixed" sub-packets comprising more than one type of data are labeled by the letters of each of the data types they contain. For example, sub-packets 310 in block 308 that contain both control (C) data and guard (G) data are labeled by both G and C.

In accordance with an embodiment of the invention, V data, is encoded into S4D-P(16,16) symbols, and I data, C data and G data are encoded into S4D-P(16,8) symbols. Since each T-period of V data comprises 24 bits of data, each V period is encoded to 1.5 S4D-P(16,16) symbols. Similarly, each I data period comprises 12 bits of data and is encoded to 1 S4D-P(16,8) symbol and each C data or G period comprises 6 bits of data and is encoded to 0.5 S4D-P(16,8) symbols. With the addition of the sub-packet header comprising one S4D-P(16,4) symbol, each type of V data sub-packet 310 comprises 25 S4D-P(16,16) symbols, each I data sub-packet comprises 17 S4D-P(16,8) symbols and each C or CG sub-packet 310 comprises 9 S4D-P(16,8) symbols. The number of S4D-P(16,i) symbols in each type of sub-packet 310 in FIG. 3 is shown in parentheses for at least one of the type of sub-packet below the sub-packet.

In accordance with an embodiment of the invention, V data is always encapsulated in sub-packets 310 comprising only V data in addition to the sub-packet header. Therefore, if data in a sequence of 16 T-periods that is to be encapsulated in a sub-packet includes T-periods having data other than V data followed by T-periods having V data, the sub-packet is a "shortened sub-packet" generated only from data in the non-V data T-periods and includes data in less than 16 T-periods. V data in the remaining T-periods are encapsulated in a next sub-packet. A shortened sub-packet 310 comprising data from only 8 T-periods is distinguished by a reference numeral 312.

In a process step 314, sub-packets 310 are encapsulated in U-Pacs 320 having a configuration shown for U-Pac 100 (FIG. 1B). U-Pacs 320 encapsulating sub-packets 310 generated in process step 314 are shown in a U-Pac data block 330. In accordance with an embodiment of the invention, each U-Pac 320 typically comprises, 4 sub-packets 310 (data from 64 T-periods of data block 304), a U-Pac header 321 comprising two S4D-P(16,4) symbols and a U-Pac tail 322 comprising two S4D-P(16,4) symbols. Similar to the case of sub-packets 310, optionally, a U-Pac 320 does not "mix" sub-packets 310 having V data with sub-packets 310 comprising other than V data. In accordance with an embodiment of the invention, a sub-packet 310 comprising V data is encapsulated in a same U-Pac 320 only with other sub-packets 310 comprising V data. As a result, to satisfy the non-mixing constraint, a U-Pac 310 such as for example a U-Pac 320 distinguished in FIG. 3 by a reference numeral 324, may comprise less than 4 sub-packets 310.

A total of 35 U-Pacs 320, labeled U-Pac 1-U-Pac 35, generated as described above are required to encapsulate all the TMDS data comprised in data block 304 that defines a single 1080 p 24 bpp+8 L-PCM audio sampled at 192 KHz. Of the 35 U-Pacs 320, 30 U-Pacs comprise pixel defining D data and 5 U-Pacs comprise control and/or audio data. Since different sub-packets 310 may comprise different numbers of S4D-P (16,i) symbols and as noted above, different U-Pacs 320 may comprise different numbers of sub-packets, different U-Pacs 320 may comprise different numbers of S4D-P(16,i) symbols. A number of S4D-P(16,i) symbols in each U-Pac 320 in U-Pac data block 330 is shown for each U-Pac 320. A total of 3346 S4D-P(16,i) symbols are used to encapsulate the TMDS data for data block 304.

In order to support the refresh rate of 60 Hz, DWM transceiver 21 must transmit 60×1125 lines of 3346 S4D-P(16,i) symbols to DWM transceiver 31 every second for a transmission rate of about 226 Msym/sec. In an embodiment of the invention, DWM transceivers 21 and 31 operate at transmission rates of 250 Msym/sec, which readily supports the bandwidth required for 226 Msym/sec simplex transmission of TMDS data plus 9 Msym/sec full duplex Ethernet transmission noted above between the transceivers. In an embodiment of the invention, the transceivers operate at transmission rates of 500 Msym/sec which supports simultaneous transmission of two TMDS streams plus full duplex Ethernet.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A method comprising: transmitting, by a first transceiver, a packet-based downstream transmission of lossless high definition digital video over a first physical medium comprising at least one conductive wire; transmitting, by the first transceiver, a packet-based downstream transmission of a bidirectional data channel over a second physical medium comprising at least one conductive wire, wherein the first physical medium and the second physical medium have at least one common wire; transmitting, by a second transceiver, an upstream transmission of the bidirectional data channel over the common wire; and accepting, by the second transceiver, predefined packets that are detected as erroneous; wherein frequency bands of the upstream and downstream transmissions at least partially overlap.

2. The method of claim 1, further comprising modulating the downstream transmission of the lossless high definition digital video with a first modulation providing a first level of protection against noise; and modulating the downstream transmission of the bidirectional data channel with a second modulation providing a second level of protection against noise.

3. The method of claim 2, wherein the first and the second modulations are pulse amplitude modulations.

4. The method of claim 2, wherein the first and the second modulations use at least partially overlapping subsets of the same symbol set.

5. The method of claim 2, further comprising the step of receiving the packets of the downstream transmissions of the lossless high definition digital video and the bidirectional data channel, and mapping the received packets to the appropriate modulators.

6. The method of claim 5, wherein the different modulations use subsets of the same symbol set.

7. The method of claim 1, wherein the predefined packets are packets comprising video pixel data.

8. The method of claim 1, further comprising the step of transmitting packets containing predefined data types without an error indication overhead.

9. The method of claim 1, further comprising the step of multiplexing the various downstream transmissions before the step of transmitting the downstream transmissions.

10. A method comprising: multiplexing a first data stream and lossless high definition pixel data; transmitting, by a transceiver, the multiplexed result over a set of wires utilizing a first frequency band; and receiving, by the transceiver, a second data stream, wherein the second data stream is received over at least a subset of the wires utilized for the multiplexed transmission, and the received data stream utilizes a second frequency band that at least partially overlaps with the first frequency band; wherein the transceiver does not discard a portion of the pixel data, even upon receiving an indication that the portion of the pixel data contains an erroneous data bit; and the transceiver transmits video clock related data and video synchronization data.

11. The method of claim 10, further comprising modulating some of the symbols of the multiplexed result with a first modulation providing a first level of protection against noise, and some of the symbols of the multiplexed result with a second modulation providing a second level of protection against noise.

12. The method of claim 11, wherein the first and the second modulations are pulse amplitude modulations.

13. The method of claim 11, wherein the modulation is determined according to the symbol's data type.

14. The method of claim 11, wherein the first and the second modulations use at least partially overlapping subsets of the same symbol set.

15. The method of claim 14, wherein the symbol set is PAM-16.

16. The method of claim 11, further comprising the step of receiving the multiplexed result and mapping the symbols comprised in the multiplexed result to the appropriate demodulators.

17. The method of claim 10, wherein the lossless high definition pixel data is uncompressed high definition pixel data.

18. The method of claim 10, further comprising transmitting the multiplexed result using rate that is independent of the pixel data rate.

19. The method of claim 10, further comprising transmitting the multiplexed result using rate that depends on the pixel data rate.

20. The method of claim 10, further comprising transmitting the clock of the lossless high definition pixel data.

21. The method of claim 10, wherein the transmissions are half duplex.

22. The method of claim 21, further comprising transmitting the second data stream during blanking periods of the lossless high definition digital video.

23. The method of claim 10, wherein the transmissions are full duplex.

24. The method of claim 10, wherein the video clock related data is the video clock, which is transmitted at least occasionally.

25. A method comprising: multiplexing a first data stream and a digital video clock; transmitting the multiplexed result over a set of wires utilizing a first frequency band; and receiving a second data stream, wherein the second data stream is received over at least a subset of the wires utilized for the multiplexed transmission, and the received data stream utilizes a second frequency band that at least partially overlaps with the first frequency band; the method further comprising transmitting video pixel data and video synchronization data.

26. The method of claim 25, further comprising modulating the multiplexed first data stream with a first modulation providing a first level of protection against noise, and modulating the multiplexed digital video clock with a second modulation providing a second level of protection against noise.

27. The method of claim 26, wherein the first and the second modulations are pulse amplitude modulations.

28. The method of claim 26, wherein the first and the second modulations use at least partially overlapping subsets of the same symbol set.

29. The method of claim 28, wherein the symbol set is PAM-16.

30. The method of claim 25, wherein the digital video clock is a video clock of uncompressed high definition pixel data.

31. The method of claim 25, further comprising transmitting the multiplexed result using rate that is independent of the digital video clock.

32. The method of claim 25, further comprising transmitting the multiplexed result using rate that depends on the digital video clock.

33. The method of claim 32, wherein the digital video clock is transmitted occasionally.

34. The method of claim 25, wherein the transmissions are half duplex.

35. The method of claim 34, further comprising transmitting the second data stream during blanking periods of the video.

36. The method of claim 25, wherein the transmissions are full duplex.

\* \* \* \* \*